Patented Oct. 28, 1941

2,260,328

UNITED STATES PATENT OFFICE 2,260,328

PROCESS FOR THE MANUFACTURE OF α-β-UNSATURATED KETONES OF THE CYCLOPENTANOPOLYHYDROPHENANTHRENE SERIES

Karl Miescher, Riehen, and Albert Wettstein, Basel, Switzerland, assignors, by mesne assignments, to Ciba Pharmaceutical Products, Incorporated, Summit, N. J., a corporation of New Jersey No Drawing. Application June 5, 1936, Serial No. 83,794. In Switzerland June 18, 1935

11 Claims. (Cl. 260—397.3)

This invention relates to the manufacture of α:β-unsaturated ketones of the cyclopentanohydrophenanthrene series by treating 3.17-diketo- or 3-keto-17-hydroxy-compounds of the aetio-cholane or aetio-allo-cholane series or the derivatives thereof with halogen and then treating the halogen compounds produced with agents that eliminate hydrogen halide, for example with tertiary amines, such as pyridine, quinoline or dimethylaniline, or with salts of organic acids, such as alkali or alkaline earth acetates.

Depending on whether the process starts from compounds of the aetio-cholanone or aetio-allo-cholanone series, the halogen substitution takes place in 4- or 2-position. In the subsequent elimination of hydrogen halide there are formed the corresponding compounds of the $\Delta^{4,5}$-aetio-cholenone or $\Delta^{1,2}$-aetio-allo-cholenone series.

For instance the $\Delta^{4,5}$-androstene-dione of the Formula II is obtained from aetio-cholane-dione of the Formula I.

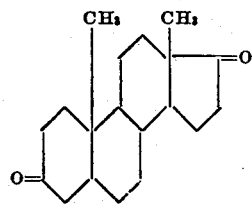

I

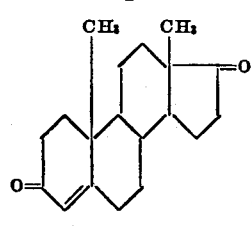

II

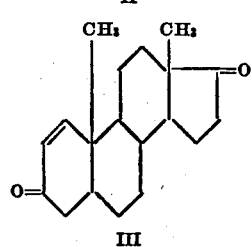

III

When starting from aetio-allo-cholane-dione, the $\Delta^{1,2}$-androstene-dione of the Formula III is obtained in analogous manner.

Androstane-ol-(17)-one-(3), its isomeride, the aetio-cholane-ol-(17)-one-(3), as well as their derivatives, such as esters or ethers, may be converted in like manner into $\Delta^{1,2}$- or $\Delta^{4,5}$-androstene-ol-(17)-one-(3) or their derivatives.

The new compounds have powerful effects, partly on the comb of capons or on the seminal vesicle, and partly in the oestrus test on the rat. They are intended for therapeutic use.

The following examples illustrate the invention:

Example 1

2.88 grams of androstane-dione of the formula

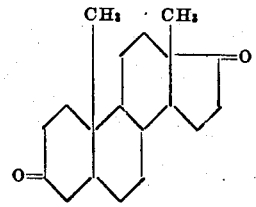

of melting point 132° C. are dissolved in 40 cc. of glacial acetic acid and there is added, by drops, to the solution a solution of 1.6 grams of bromine in 10 cc. of glacial acetic acid. Rapid decolorization occurs. The product is precipitated by addition of water and purified by recrystallization from alcohol or dilute acetone; it is thus obtained in the form of splendid needles of melting point 216° C. For the purpose of eliminating hydrogen bromide this 2-bromo-androstane-dione-(3,17) is heated to boiling in 50 cc. of dry quinoline for 5 hours. After dilution with water the quinoline is neutralized with dilute sulfuric acid and the androstene-dione which is precipitated is extracted by ether. The ethereal solution is washed with dilute sodium carbonate solution and water. The ethereal solution is then dried over sodium sulfate and evaporated. By recrystallization of the residue from hexane pure $\Delta^{1,2}$-androstene-dione-(3,17) of the formula

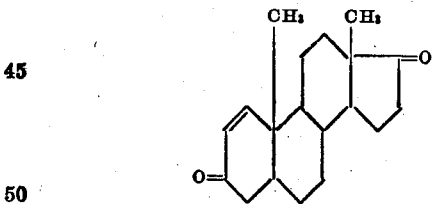

of melting point 142° C. is obtained.

The elimination of hydrogen halide may also be effected by heating with alkali or alkaline earth acetates in glacial acetic acid solution instead of with quinoline. Instead of alkali acetates there may also be used salts of other organic acids, such as for example salts of the propionic acid or the benzoic acid.

When starting from aetio-cholane-dione, the $\Delta^{4,5}$-androstene-dione-(3,17) of melting point 172–173° C. is obtained in analogous manner.

Example 2

3.32 grams of androstane-ol-(17)-one-(3)-acetate of the formula

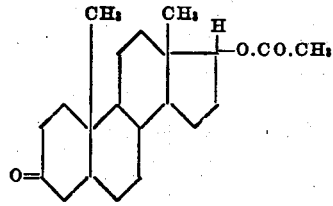

obtained as described in French Patent No. 815,896 are dissolved in 50 cc. of glacial acetic acid and, after addition of a few drops of a solution of hydrogen bromide in glacial acetic acid, the solution is gradually mixed with one of 1.6 grams of bromine in 10 cc. of glacial acetic acid. Decolorization occurs at once. The product is precipitated by addition of water and then recrystallized from dilute acetone; it is thus obtained in the form of splendid needles. For the purpose of eliminating hydrogen bromide the 2-bromo-androstane-ol-(17)-one-(3)-acetate is heated for 6 hours to about 190° C. with sodium acetate or potassium acetate in a solution of glacial acetic acid. After dilution with water the reaction product is extracted with ether. The ethereal solution is washed with water until neutral, dried and evaporated. By recrystallizing the residue from hexane there is obtained $\Delta^{1,2}$-androstene-ol-(17)-one-(3)-acetate of the formula

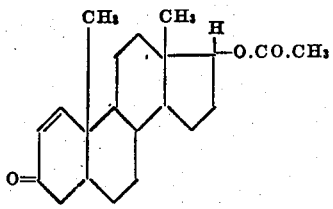

By alkaline saponification of the unsaturated ester the corresponding alcohol is obtained. The latter is also obtainable directly by starting from the free alcohol instead of from the ester.

It is also possible to start from another ester or an ether of the androstane-ol-(17)-one-(3).

Example 3

3.04 grams of the 17-methyl-androstane-ol-(17)-one-(3) of the formula

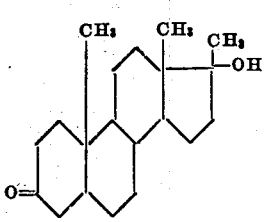

of melting point 192° C. obtained as described in French Patent No. 815,896 are mixed in glacial acetic acid solution with 1.6 grams of bromine. The 2-bromo-17-methyl-androstane-ol-(17)-one-(3) thus obtained is purified in the manner adopted in the preceding examples and then heated with dimethylaniline or potassium acetate in glacial acetic acid under pressure to eliminate hydrogen bromide, whereby the $\Delta^{1,2}$-17-methyl-androstene-ol-(17)-one-(3) of the formula

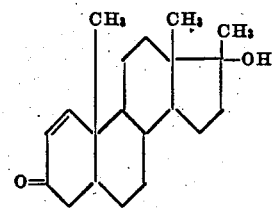

is obtained.

The reaction may be carried out in analogous manner also with another 17-alkyl-androstane-ol-(17)-one-(3), such as, for example, with the 17-ethyl compound.

Example 4

2.9 grams of aetio-cholane-ol-(17)-one-(3) of the formula

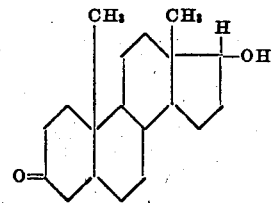

are dissolved in 60 cc. of glacial acetic acid, and after addition of a few drops of a solution of hydrogen bromide in glacial acetic acid, the solution is gradually mixed with one of 1.6 grams of bromine in 10 cc. of glacial acetic acid. Decolorization occurs at once. The product is precipitated by addition of water and then recrystallized from dilute acetone; it is thus obtained in the form of splendid needles. For the purpose of eliminating hydrogen bromide the 4-bromo-androstane-ol-(17)-one-(3) is heated with pyridine for 2 hours to about 100° C. After dilution with much water the reaction product is extracted with ether. The ethereal solution is washed repeatedly with dilute sulfuric acid, sodium bicarbonate solution and finally with water until neutral, dried and evaporated. By recrystallizing the residue from hexane or isopropyl ether, the $\Delta^{4,5}$-androstene-ol-(17)-one-(3) of the formula

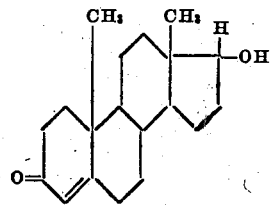

of melting point 155° C. is obtained in pure form.

Instead of pyridine there may also be used other tertiary bases, such as quinoline or dimethylaniline or salts of organic acids, such as the alkali salts or alkaline earth salts of acetic acid, propionic acid or benzoic acid. Further it is possible to start from a derivative of aetio-cholane-ol-(17)-one-(3), such as an ester or ether, instead of from aetio-cholane-ol-(17)-one-(3) itself. For the halogenation of the oxy-ketone there may also be used for instance chlorine.

What we claim is:

1. A process for the manufacture of $\alpha$-$\beta$-unsaturated 3-ketones of the cyclopentanohydrophenanthrene series, comprising causing halogen to act on saturated 3-keto-cyclopentanohydrophenanthrenes containing in the 17-position a member of the group consisting of

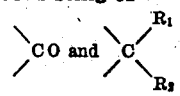

wherein $R_1$ is a member of the group consisting of free hydroxyl, esterified hydroxyl and etherified hydroxyl, and $R_2$ is a member of the group consisting of alkyl and hydrogen, and treating the halogen compounds thus produced with an agent that eliminates hydrogen halide.

2. A process for the manufacture of unsaturated $\Delta^{1,2}$-ketones of the cyclopentanohydrophenanthrene series of the formula

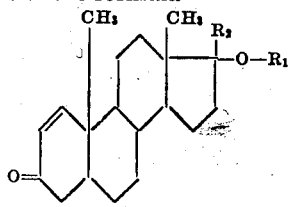

wherein $R_1$ means acyl and $R_2$ is a member of the group consisting of alkyl and hydrogen comprising causing halogen to act on 3-keto-aetioallo-cholanes of the formula

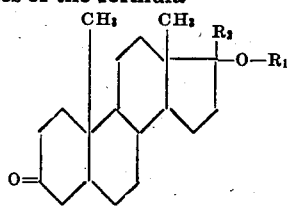

wherein $R_1$ means acyl and $R_2$ is a member of the group consisting of alkyl and hydrogen, and treating the halogen compounds thus produced with an agent that eliminates hydrogen halide.

3. A process for the manufacture of $\Delta^{1,2}$-androstene-ol-(17)-one-(3)-acetate of the formula

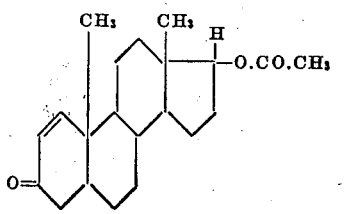

comprising causing halogen to act on androstene-ol-(17)-one-(3)-acetate of the formula

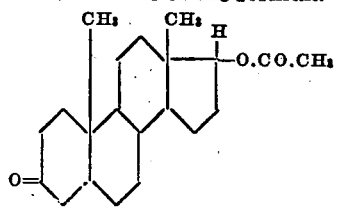

and treating the halogen compound thus produced with an agent that eliminates hydrogen halide.

4. A process for the manufacture of $\Delta^{4,5}$-androstene-dione-(3,17) of the formula

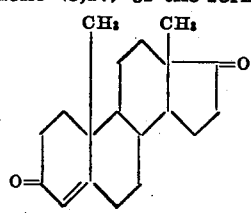

comprising causing halogen to act on aetiocholane-dione-(3,17) of the formula

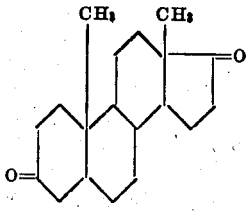

and treating the halogen compound thus produced with an agent that eliminates hydrogen halide.

5. A process for the manufacture of unsaturated $\Delta^{4,5}$-3-ketones of the cyclopentanohydrophenanthrene series of the formula

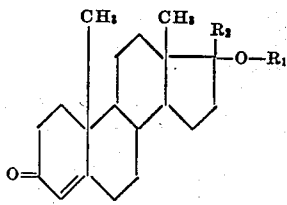

wherein $R_1$ is a member of the group consisting of acyl and hydrogen and $R_2$ is a member of the group consisting of alkyl and hydrogen, comprising causing halogen to act on 3-keto-aetiocholanes of the formula

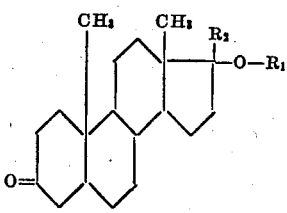

wherein $R_1$ is a member of the group consisting of acyl and hydrogen and $R_2$ is a member of the group consisting of alkyl and hydrogen, and treating the halogen compounds thus produced with an agent that eliminates hydrogen halide.

6. A process for the manufacture of $\Delta^{4,5}$-androstene-ol-(17)-one-(3) of the formula

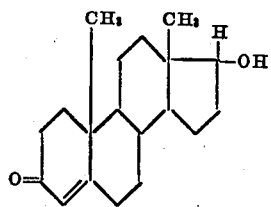

comprising causing halogen to act on aetiocholane-ol-(17)-one-(3) of the formula

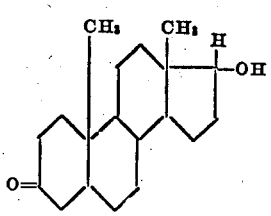

and treating the halogen compound thus produced with an agent that eliminates hydrogen halide.

7. The Δ¹,²-androstene-ol-(17)-one-(3)-acetate of the formula

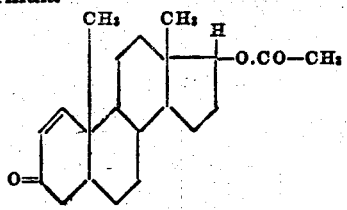

8. A method for the production of 3-ketones of the cyclopentano-10,13-dimethyl polyhydro phenanthrenes which are unsaturated in the first ring, comprising reacting a saturated 3-keto-17-R-cyclopentano-10,13-dimethyl polyhydro phenanthrene compound, wherein R is a member of the group consisting of

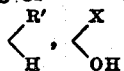

and =O, R' being a member of the class consisting of the hydroxyl group and groups which with the aid of hydrolysis can be replaced by a hydroxy group, and X an alkyl radical, with a halogen to introduce halogen into the first ring, and then reacting the halogenated compound with an agent capable of splitting off hydrogen halide therefrom.

9. A method for the production of 3-ketones of the cyclopentano-10,13-dimethyl polyhydro phenanthrenes which are unsaturated in the first ring, comprising reacting androstandione with a halogen to introduce halogen into the first ring, and then reacting the halogenated compound with an agent capable of splitting off hydrogen halide therefrom.

10. A method for the production of 3-ketones of the cyclopentano-10,13-dimethyl polyhydro phenanthrenes which are unsaturated in the first ring, comprising reacting an androstanol-17-one-3 with bromine to introduce the same into the first ring, and then reacting the halogenated compound with an agent capable of splitting off hydrogen bromide therefrom.

11. A method for the production of 3-ketones of the cyclopentano-10,13-dimethyl polyhydro phenanthrenes which are unsaturated in the first ring, comprising reacting an androstanol-17-one-3 with a halogen in the presence of the corresponding hydrohalic acid and of acetic acid to introduce halogen into the first ring, and then reacting the halogenated compound with an agent capable of splitting off hydrogen halide therefrom.

KARL MIESCHER.
ALBERT WETTSTEIN.